United States Patent
Pierce et al.

(10) Patent No.: US 9,083,805 B2
(45) Date of Patent: Jul. 14, 2015

(54) SYSTEM AND METHOD FOR PROVIDING SERVICE BY A FIRST AGENT WHILE WAITING FOR A SECOND AGENT

(75) Inventors: Russell K. Pierce, Brighton, CO (US); Joylee E. Kohler, Northglenn, CO (US); Katherine Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 301 days.

(21) Appl. No.: 13/226,449

(22) Filed: Sep. 6, 2011

(65) Prior Publication Data
US 2013/0058475 A1 Mar. 7, 2013

(51) Int. Cl.
*H04M 3/00* (2006.01)
*H04M 5/00* (2006.01)
*H04M 3/523* (2006.01)

(52) U.S. Cl.
CPC ...... *H04M 3/5233* (2013.01); *H04M 2203/404* (2013.01)

(58) Field of Classification Search
CPC . H04M 3/523; H04M 3/5232; H04M 3/5141; H04M 3/436
USPC ............ 379/265.01, 265.02, 265.05, 265.11, 379/265.12, 266.01, 266.02, 266.06
See application file for complete search history.

(56) References Cited

U.S. PATENT DOCUMENTS

| | | | |
|---|---|---|---|
| 5,953,332 A * | 9/1999 | Miloslavsky | 370/352 |
| 5,991,392 A * | 11/1999 | Miloslavsky | 379/265.02 |
| 6,408,066 B1 * | 6/2002 | Andruska et al. | 379/265.12 |
| 6,636,598 B1 * | 10/2003 | Thomson et al. | 379/265.05 |
| 6,665,396 B1 * | 12/2003 | Khouri et al. | 379/266.01 |
| 6,959,081 B2 * | 10/2005 | Brown et al. | 379/265.11 |
| 7,110,525 B1 * | 9/2006 | Heller et al. | 379/265.11 |
| 8,073,129 B1 * | 12/2011 | Kalavar | 379/265.01 |
| 2001/0024497 A1 * | 9/2001 | Campbell et al. | 379/265.09 |
| 2007/0160054 A1 * | 7/2007 | Shaffer et al. | 370/395.2 |
| 2008/0008309 A1 * | 1/2008 | Dezonno et al. | 379/265.02 |
| 2008/0095354 A1 * | 4/2008 | O'Connor et al. | 379/265.01 |
| 2010/0166171 A1 * | 7/2010 | Velusamy | 379/265.11 |
| 2011/0090899 A1 * | 4/2011 | Fedorov | 370/352 |
| 2011/0091030 A1 * | 4/2011 | Bhat et al. | 379/265.09 |
| 2012/0183131 A1 * | 7/2012 | Kohler et al. | 379/265.12 |

* cited by examiner

*Primary Examiner* — Oleg Asanbayev
(74) *Attorney, Agent, or Firm* — Maldjian Law Group LLC; John Maldjian; Alexander D. Walter

(57) ABSTRACT

System and method for servicing a contact by a first agent while searching for a second agent to service the contact is provided. At least one agent attribute is used to produce a set of agent attribute values, and at least one contact attribute is used to produce a set of contact attribute values; relating agent attribute values to contact attribute values in order to search for at least one available first agent having at least a first predetermined level of matching attributes; delivering the contact to the first agent; relating agent attribute values to contact attribute values in order to search for at least one second agent having at least a second predetermined level of matching attributes, wherein the second predetermined level is greater than the first predetermined level; waiting until the second agent is available; and replacing the first agent with the second agent to service the contact.

21 Claims, 7 Drawing Sheets

US 9,083,805 B2

SYSTEM AND METHOD FOR PROVIDING SERVICE BY A FIRST AGENT WHILE WAITING FOR A SECOND AGENT

BACKGROUND

1. Field of the Invention

Embodiments of the present invention generally relate to contact center resource management. More specifically, embodiments of the present invention relate to a system and method for providing customer service using a first agent while waiting for a second agent.

2. Description of the Related Art

To achieve customer satisfaction, a contact center attempts to provide the appropriate agent to a contact (a.k.a. customer) so the agent may best assist the contact with his or her specific needs. That is, a contact center will commonly assign a particular agent to a contact based on a set of parameters such as attributes from a work assignment engine, and/or particular skills of the agent, and/or any other means. The agent, who has been matched to the contact based upon these parameters, is then commonly referred to as the "preferred" agent for that particular contact at that particular time.

This matching of a preferred agent with a contact is often achieved by "delivering" the contact to the agent after the agent has been matched. For example, certain agents with certain work assignments or skill sets that match the contact when that contact makes a request for assistance from an agent are routed to the appropriate contact by way of, for example, an assignment engine. Existing contact center systems and methods are capable of providing preferred agents to a perspective contact based upon a match of the agent. However, if the preferred agent is not available for a particular contact making a request, the contact may be routed to a non-preferred agent to avoid a perceived unacceptable idle or wait time. As a result, the contact is routed to an agent that may not be the best match for that contact at that particular time with that contact's particular issue. Customer satisfaction, although intended to be met or exceeded by avoiding any wait time, may actually be compromised or not rise to the level of satisfaction so desired or required by the contact center.

Similarly, if a preferred agent has completed his or her job with a contact and the next contact is not waiting to be picked up by the preferred or matched agent, the agent is commonly, almost immediately assigned to a non-preferred contact and another opportunity for customer satisfaction escapes the contact center.

Known systems for matching contact with preferred agent and vice versa include Avaya's CC Elite 6.0. This system includes the concept of preferred agents based on skill level.

Under certain conditions, the contact center may offer a contact to a first, non-preferred agent who is relatively unskilled at handling the problem presented by the contact. This condition may occur when it is deemed that the customer will likely abandon the contact, and no other agents having a better match to the attributes needed by the contact are available. Once this match is made, there currently is no way to wait for or to keep looking for a preferred agent and to gracefully add the preferred agent to the contact.

Thus, there is a need for a system and method that provides a means to allow a contact, albeit after waiting some amount of time or period, to be delivered to a first agent before that contact is joined to a second, more preferred agent.

SUMMARY

Embodiments of the present invention relate to a system and method for providing customer service using a first agent while waiting for a second agent. In particular, the second agent will be a preferred agent by reason of the skills and attributes of the second agent.

In one embodiment of the present invention, there is provided a method to service a contact by a first agent while searching for a second agent to service the contact, comprising: describing substantially each undifferentiated agent by use of at least one agent attribute to produce a set of agent attribute values; describing a contact by use of at least one contact attribute to produce a set of contact attribute values; relating the set of agent attribute values to the set of contact attribute values in order to search for at least one available first agent having at least a first predetermined level of match between the set of agent attribute values and the set of contact attribute values; delivering the contact to the first agent; relating the set of agent attribute values to the set of contact attribute values in order to search for at least one second agent having at least a second predetermined level of match between the set of agent attribute values and the set of contact attribute values, wherein the second predetermined level of match is greater than the first predetermined level of match; waiting until the second agent is available; and replacing the first agent with the second agent to service the contact.

In one embodiment of the present invention, there is provided a system to service a contact by a first agent while searching for a second agent to service the contact, comprising: a processor; a memory coupled to the processor, the memory configured to store software that, when executed by the processor, performs the steps of: describing substantially each undifferentiated agent by use of at least one agent attribute to produce a set of agent attribute values; describing a contact by use of at least one contact attribute to produce a set of contact attribute values; relating the set of agent attribute values to the set of contact attribute values in order to search for at least one available first agent having at least a first predetermined level of match between the set of agent attribute values and the set of contact attribute values; delivering the contact to the first agent; relating the set of agent attribute values to the set of contact attribute values in order to search for at least one second agent having at least a second predetermined level of match between the set of agent attribute values and the set of contact attribute values, wherein the second predetermined level of match is greater than the first predetermined level of match; waiting until the second agent is available; and replacing the first agent with the second agent to service the contact.

In one embodiment of the present invention, there is provided a system to service a contact by a first agent while searching for a second agent to service the contact, comprising: an agent description module configured to describe substantially each undifferentiated agent by use of at least one agent attribute to produce a set of agent attribute values; a contact description module configured to describe a contact by use of at least one contact attribute to produce a set of contact attribute values; a first correlation module configured to relate the set of agent attribute values to the set of contact attribute values in order to search for at least one available first agent having at least a first predetermined level of match between the set of agent attribute values and the set of contact attribute values; a delivery module configured to deliver the contact to the first agent; a second correlation module configured to relate the set of agent attribute values to the set of contact attribute values in order to search for at least one second agent having at least a second predetermined level of match between the set of agent attribute values and the set of contact attribute values, wherein the second predetermined level of match is greater than the first predetermined level of match; a wait module configured to wait until the second agent is available; and a replacement module configured to replace the first agent with the second agent to service the contact.

BRIEF DESCRIPTION OF THE DRAWING

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

Figure 1:
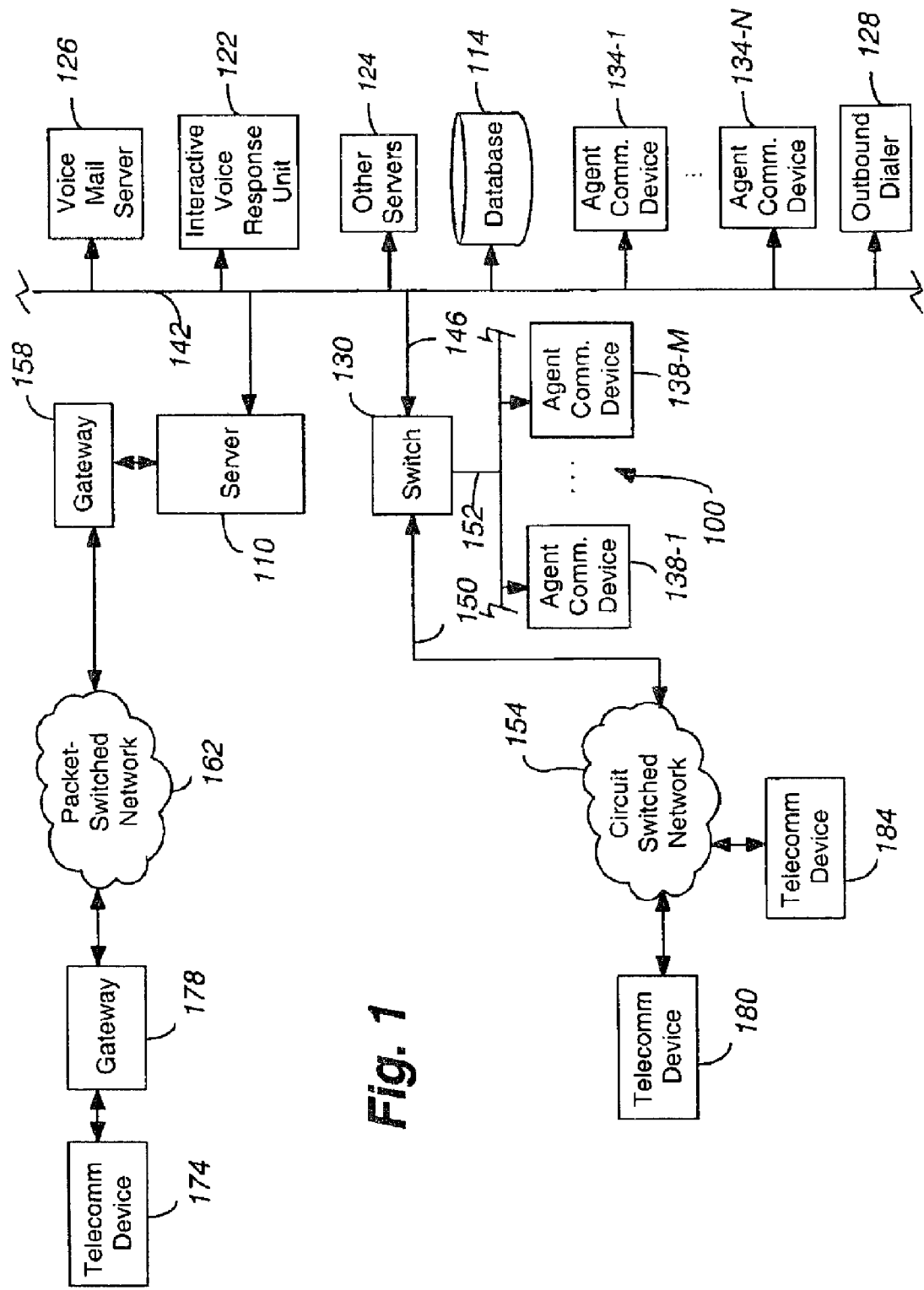
FIG. 1 is a block diagram depicting a contact center in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines.

DETAILED DESCRIPTION

Embodiments of the present invention generally relate to a system and method for servicing a contact by a first agent while searching for a second agent. In particular, the second agent will have skills and attributes that are a better match to the skills and attributes desired by the customer, compared to that provided by the first agent.

Skills and attributes of agents that may be useful for embodiments of the present invention include: a proficiency in a subject matter; a preferred language; a preferred location; a revenue potential; a first call resolution rate; an average quality score; and an average contact satisfaction score. Attributes of customers that may be useful for embodiments of the present invention include: customer attributes comprises one or more of: a preferred language; a preferred location; a repeat contact status; a purpose for contact; a required proficiency; a revenue potential; a quality score; and a customer satisfaction score.

As used herein in connection with embodiments of the present invention, the term "contact" is defined as a customer or consumer of contact center resources, such as contact center agents or preferred agents. Although described in the context of a contact center, it is to be understood that this system and method is contemplated and within the scope of embodiments of this present invention to be applied to any system and method where agents are called upon to assist customers at any given time, where such agents are matched up to qualify as preferred agents for such contacts based upon a set of matching parameters. These parameters may be attributes generated by a work assignment engine or a skills-based system.

As used herein, the terms "engine" and/or "module" refer generally to a logical sequence or association of steps, processes or components. For example, a software engine or module may comprise a set of associated routines or subroutines within a computer program. Alternatively, an engine or a module may comprise a substantially self-contained hardware device. An engine or a module may also comprise a logical set of processes irrespective of any software or hardware implementation.

FIG. 1 depicts an illustrative embodiment of a contact center of the present invention where contact center agents may service preferred contacts, either singularly or in multiples, simultaneously or substantially simultaneously, after a tolerable wait period or by way of an interruption from auxiliary work. A contact center 100 comprises a central server 110 (described in more detail in connection with FIG. 2), a set of data stores or databases 114, which may or may not be contained within the central server 110, the databases 114 containing agent metrics, historical agent and contact data, other contact related information, and other information in general that can enhance the value and efficiency of the contact, and a plurality of servers, namely a voice mail server 126, an Interactive Voice Response (IVR) unit/system 122, and other servers 124, an outbound dialer 128, a switch 130, a plurality of working agents operating packet-switched (first) telecommunication devices 134-1 to N (such as computer work stations or personal computers or handheld communication devices including wireless communication devices), and/or circuit-switched (second) telecommunication devices 138-1 to M, all interconnected by a local area network LAN (or wide area network WAN) 142.

The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, and an email server) and the like. The switch 130 is connected, via a plurality of trunks 150, to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, and the like.

The server and/or switch can be a software-controlled system, including, but not limited to, a processing unit (CPU), microprocessor, or other type of digital data processor executing software or an Application-Specific Integrated Circuit (ASIC) as well as various portions or combinations of such elements.

Figure 2:
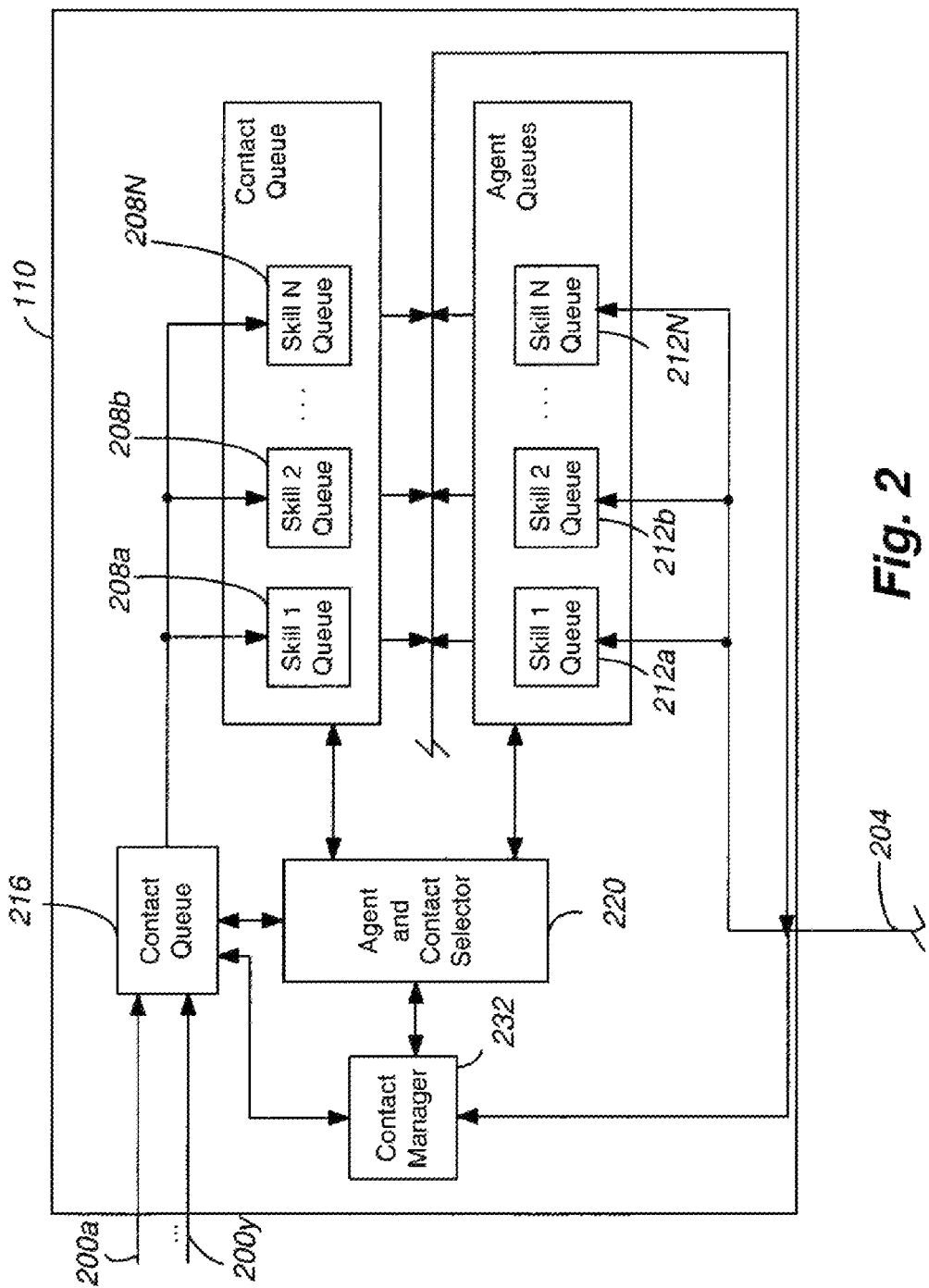
FIG. 2 is a block diagram depicting a server of the contact center of FIG. 1 in accordance with an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a Basic Call Management System (BCMS) (not shown) and a Call Management System (CMS) (not shown) that gathers call records and contact-center statistics for use in generating contact-center reports.

The switch 130 and/or server 110 can be any computer and/or telecommunication architecture for directing contacts to one or more telecommunication devices to be serviced by one or more preferred agents. Illustratively, the switch and/or server 110 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™; Communication Manager™, and/or S8300™ media server.

Typically, the switch/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and are either enqueued in individual ones of the contact queues 208a-n in their respective orders of priority or are enqueued in different ones of a plurality of contact queues that correspond to a different priority.

Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill. Each one of which corresponds to a different expertise level. Although depicted for clarity sake as skills of the agents, these queues equally may represent agent attributes or some other parameters such that the agents are matched up with contacts on a preferred agent basis.

In one embodiment of the present invention, as depicted in FIG. 2, a contact vector (queue) 216 is included among the control programs in the server 110. Contacts incoming to the contact center may be assigned by contact vector 216 to different contact queues 208a-n based upon a number of predetermined criteria, including customer identity, customer needs, contact center needs, current contact center queue lengths, customer value, and the agent skill, attributes or other parameters required for the proper handling of the contact and being designated as a preferred agent for a particular contact.

Agents who are determined to be preferred agents for a given contact, and are available for handling said contacts are assigned to agent queues 212a-n based upon the skills or attributes they possess. An agent may have multiple skills, attributes or other parameters, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3. Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be Avaya Inc.'s, G700 Media Gateway™, and may be implemented as hardware, such as via an adjunct processor (as shown) or as a chip in the server.

The first telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises directly serviced by the switch. More particularly, these extensions correspond to conventional telecommunication device endpoints serviced by the switch/server, and the switch/server can direct incoming contacts or calls to, and receive outgoing contacts or calls, from these extensions in a conventional manner. The second telecommunication devices can include, for example, wired and wireless telephones, PDAs, H.320 video phones and conferencing units, voice messaging and response units, and traditional computer telephony adjuncts.

It should be noted embodiments of the present invention do not require any particular type of information transport medium between switch or server and first and second telecommunication devices. That is, the present invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol (SIP) compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk. It should be understood the configuration of the switch, server, user telecommunication devices, and other elements as shown in FIG. 1 is for purposes of illustration only and should not be construed as limiting the present invention to any particular arrangement of elements.

As will be appreciated, the central server 110 is notified via LAN 142 of an incoming contact (e.g., a call) by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, and/or first or second telecommunication devices 134, 138 associated with a selected preferred agent.

The server 110 distributes and connects these contacts to telecommunication devices of available preferred agents based on the predetermined criteria noted above. When the central server 110 forwards a voice contact to a preferred agent, the central server 110 also forwards customer-related information from databases 114 to the preferred agent's computer work station for viewing (such as by a pop-up display) to permit the preferred agent to better serve the contact. The preferred agent will then process the contact(s) sent to him/her by the server 110.

According to embodiments of the present invention, included among the programs executing on the server 110 are a preferred agent and contact selector 220 and contact manager 232. The selector 220 and manager 232 are stored either in the main memory or in a peripheral memory (e.g., disk, CD ROM, etc.) or some other computer-readable medium of the center 100. The selector 220 and manager collectively effect an assignment between contacts in a queue and preferred agents serving the queue (either singularly or in multiple assignments) in a way that tends to maximize contact center efficiency.

Figure 3:
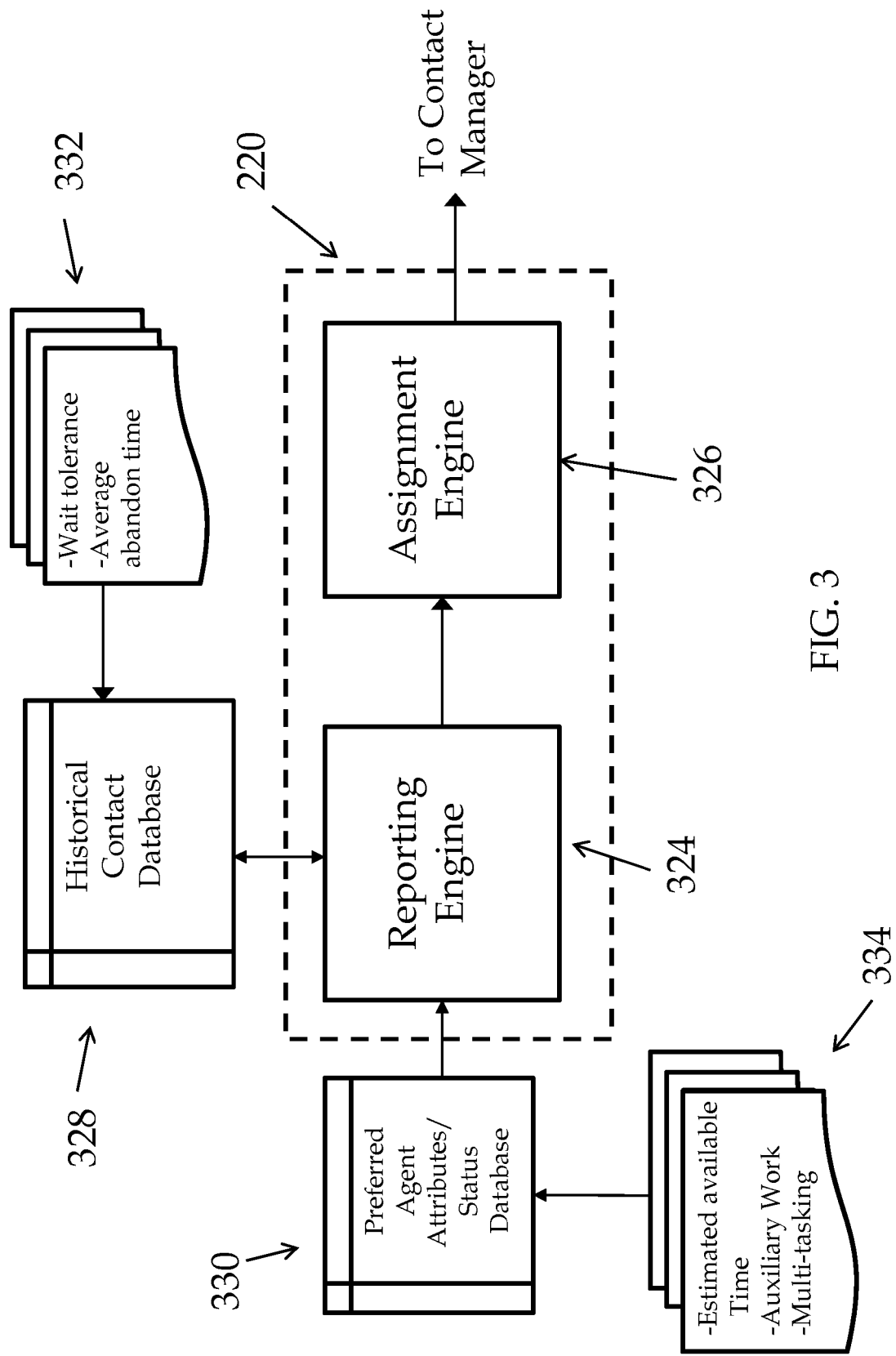
FIG. 3 is system block diagram of the server of FIG. 2, depicting a reporting engine and assignment engine in accordance with an embodiment of the present invention.

The selector 220 comprises a reporting engine 324 and assignment engine 326, see FIG. 3, which use predefined criteria in selecting a preferred agent to service the contact and whether one preferred agent is capable of being assigned to more than one contact at any given time.

In an embodiment of the present invention, the contact manager 232 receives assignment information from the selector 220, which selector has determined and identified, in addition to matching a preferred agent with a contact, dependant on skills, attributes or other parameters matched, the then current agent's availability, albeit not readily but within a tolerable wait period of the selected agent for singular or multiple contacts support, and provides instructions to the selector 220 to effect same.

The contact manager 232, based on one or more selected criteria, and agent match and availability or near availability, may determine which contacts will be assigned to the same preferred agent. One or more of the parameters can be used along or in any combination and include but are not limited to, average customer satisfaction score, average revenues, preferred language, preferred location, revenue potential, first call resolution rate, average quality score, and the like.

It is understood by embodiments of the present invention that a server, such as the one depicted in FIG. 2, may be connected to a computer network or system. A computer network includes the Internet, a global computer network, an internal computer network, dedicated server networks, and the like.

Referring to FIG. 3, which details the preferred agent and contact selector 220 of FIG. 2, there is provided within the selector 220 the reporting engine 324 and the assignment engine 326. The assignment engine may also be referred to herein as a work assignment engine. Contact historical database 328 communicates with the reporting engine 324. In addition, a preferred agent attribute and status database 330 also communicates with the reporting engine 324.

The type of historical data stored internally in the historical contact database 328 includes, among other information, wait tolerances and average abandon time of the contact 332 and estimated time for preferred agent availability, preferred agent auxiliary work schedule and preferred agent's multitasking capabilities 334.

It is to be understood that, although embodiments of the present invention are described as gathering attributes or skills data as well as availability status data for one agent, these descriptions equally apply to more than one agent and in fact may apply to as many agents contained within a contact center or multiple contact centers at any given time. Similarly, although the historical contact database is referring to one contact's information, it is to be understood that the database 328 may contain historical information for one or more contacts. Furthermore, while embodiments of the present invention are described in connection with one contact center, it should be understood that it is within the scope of the present invention that these same systems and methods are scalable to be applied to agents at more than one contact center at any given time.

For example, although the description of the server 110, the agent and contact selector 220 and their respective sub-elements are discussed in the singular, it is understood that these elements 110 and 220 may represent multiple contact centers or each contact center may include one or more of these servers 110 and agent/contact selectors 220, or any combinations thereof. The system and method is described herein in the singular for purposes of clarity only.

In operation, referring to FIGS. 2 and 3, when contacts are received from the gateway 158 (FIG. 1) and queued on the communication lines 200a-y, the agent and contact selector 220 begins the selection process of matching preferred agents to contacts. This includes matching contact skill set or attribute requirements with agent skills or attributes.

Prior to making the decision whether or not to assign a preferred agent to a contact and deliver that contact to the preferred agent, the agent's skills and attribute data is stored in the database 330. Such data includes information that has been collected about the agent prior to the current session of assigning one or more contacts to the agent. That is, this data may be any and all information that has been previously collected and stored about the agent relating to the agent's parameters prior to the current session in which the agent is being assigned contacts. Therefore, this information can be sourced from months, weeks, or days ago, to as recently as information from a t-1 agent/contact session, i.e., the agent/contact session just prior to the current agent/contact session.

Once this information regarding the agent's data is stored in database 330, the agent's then current status is sent to the reporting engine 324 for use when needed. The reporting engine then uses this data to determine if the agent is preferred by the contact next queued by the agent and contact selector 220. Once the reporting engine 324 determines that at a given moment the agent is preferred, the assignment engine 326 will report same to the contact manager 232 to deliver a predetermined contact to that preferred agent. If the preferred agent is available, then the contact is assigned to the preferred agent. Otherwise, the contact is assigned to a non-preferred agent.

Figure 4:
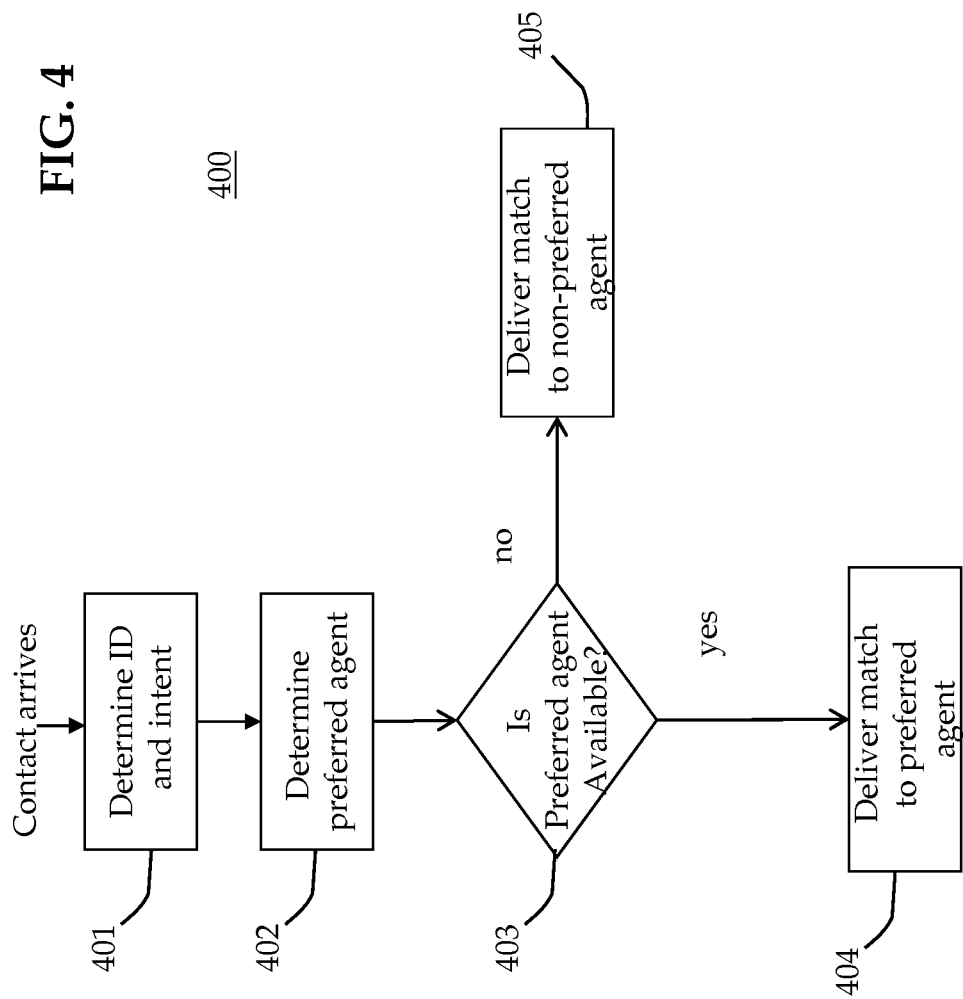
FIG. 4 is a flow chart depicting a flow for assigning preferred agents to contacts based upon availability.

FIG. 4 illustrates a process 400 at a high level of abstraction, in accordance with the foregoing description. After a new contact arrives, an identification and intent (or reason for contacting) is determined at step 401. Next, at step 402, a preferred agent is determined. An agent may be preferred by reason of a closer match between the skills and attributes of the agent, and the skills and attributes requested by the customer. The availability of the preferred agent is determined at decision point 403.

If the preferred agent is available, the contact is assigned to the preferred agent at step 404. However, if the preferred agent is not available, then the contact is assigned to a non-preferred agent at step 405. In this situation, having the contact be serviced by a non-preferred agent who is less closely matched to the customer's attributes than a preferred agent is better than risking that the customer will abandon the contact.

In accordance with embodiments of the present invention, if after a preferred agent has been identified and that preferred agent is not readily available for the contact to be delivered and the contact has been assigned to a non-preferred agent, then the agent and contact selector 220 may perform an additional process of: continuing to search for or wait for a preferred agent; and, if a preferred agent becomes available during the contact, join the preferred agent to the contact.

Figure 5:
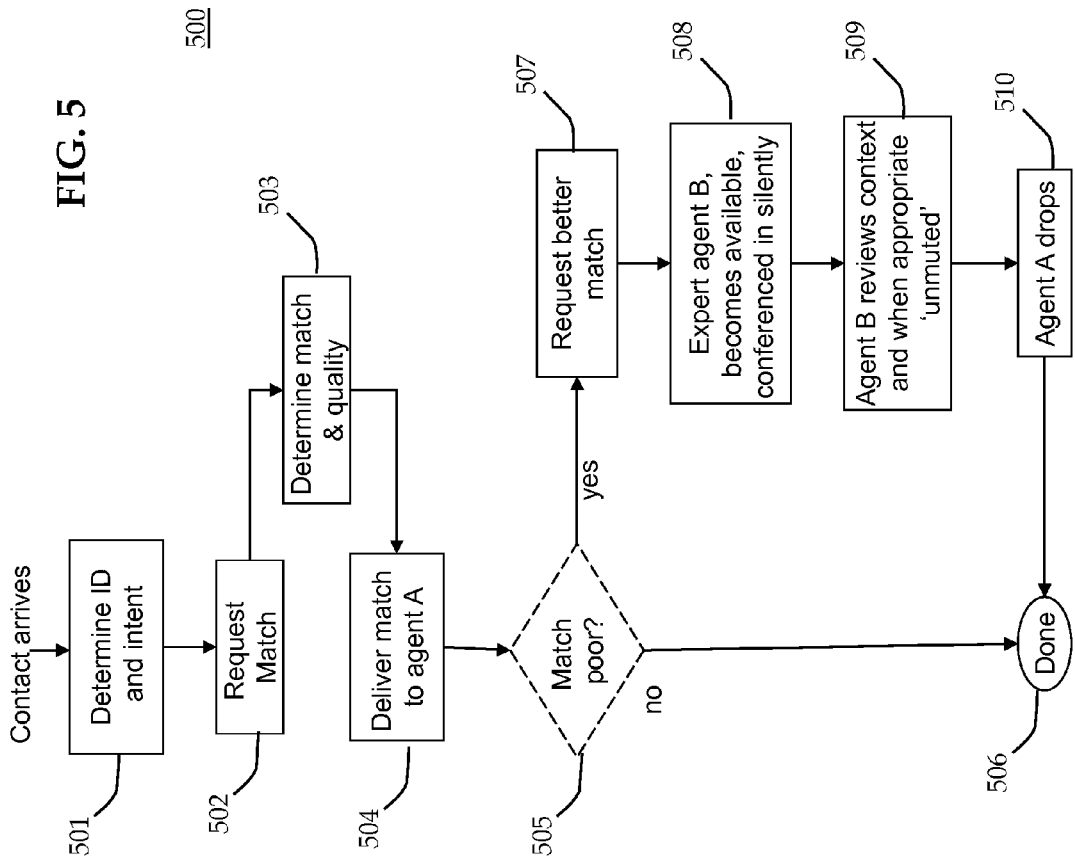
FIG. 5 is a flow chart depicting a flow for servicing a customer with a first agent while searching for a second agent, in accordance with an embodiment of the present invention.

In accordance with one embodiment of the present invention, utilizing the systems described in FIGS. 1-3, there is provided a method depicted in the flow diagram 500 of FIG. 5 for attempting to deliver contacts to preferred agents in a contact center, after the contacts have already been delivered to non-preferred contacts.

The method begins at step 501 where at least an identification ("ID") and intent (e.g., reason for contacting) is determined for a contact that has arrived. Additional information may be obtained in order to help identify a preferred agent. At step 502, the contact center requests a match between the contact's attributes, ID and/or intent, with agent skills and attributes. At step 503, the contact's attributes, ID and/or intent are analyzed together with the agent skills and attributes, such as but not limited to factors described above in connection with FIG. 2, in order to find a first available agent who has at least a minimum level of match to the contact. At step 504, a match to the contact is delivered to such an available agent, and the available agent can begin to service the customer. At optional step 505, a determination is made whether or not the agent's skills and attributes are a poor match to the contact's attributes, ID and/or intent. Whether or not the match is poor may be determined by either the system or the customer, and may depend on factors beyond skills and attributes, such as the priority or urgency perceived by the customer. If the match is not poor, then control of flow diagram 500 passes to step 506 to end. If optional step 505 is not performed, then control of flow diagram 500 passes to step 507 as described below in further detail.

Otherwise, if it is determined from step 505 that the match is poor, then control of flow diagram 500 passes to step 507 at which a better match is requested by the system. At step 508, after some period of time has passed, a second agent has become available such that the skills and attributes of the second agent are a better match to the contact attributes, ID and/or intent than that of the first agent. The second agent may be conferenced (i.e., joined) to the call, usually without announcement. At step 509, the second agent reviews the context of the call so far that had taken place with the first agent, and then at some point such as when the second agent is ready to take over the contact, either the first or second agent will announce to the contact that the second agent will take over the customer contact. Although the second agent could take over the contact without reviewing the context of the contact, doing so will provide for a smoother transition from the first agent to the second agent. At step 510, the first agent drops off the contact, and control of slow chart 500 passes to step 506 to end.

Figure 6:
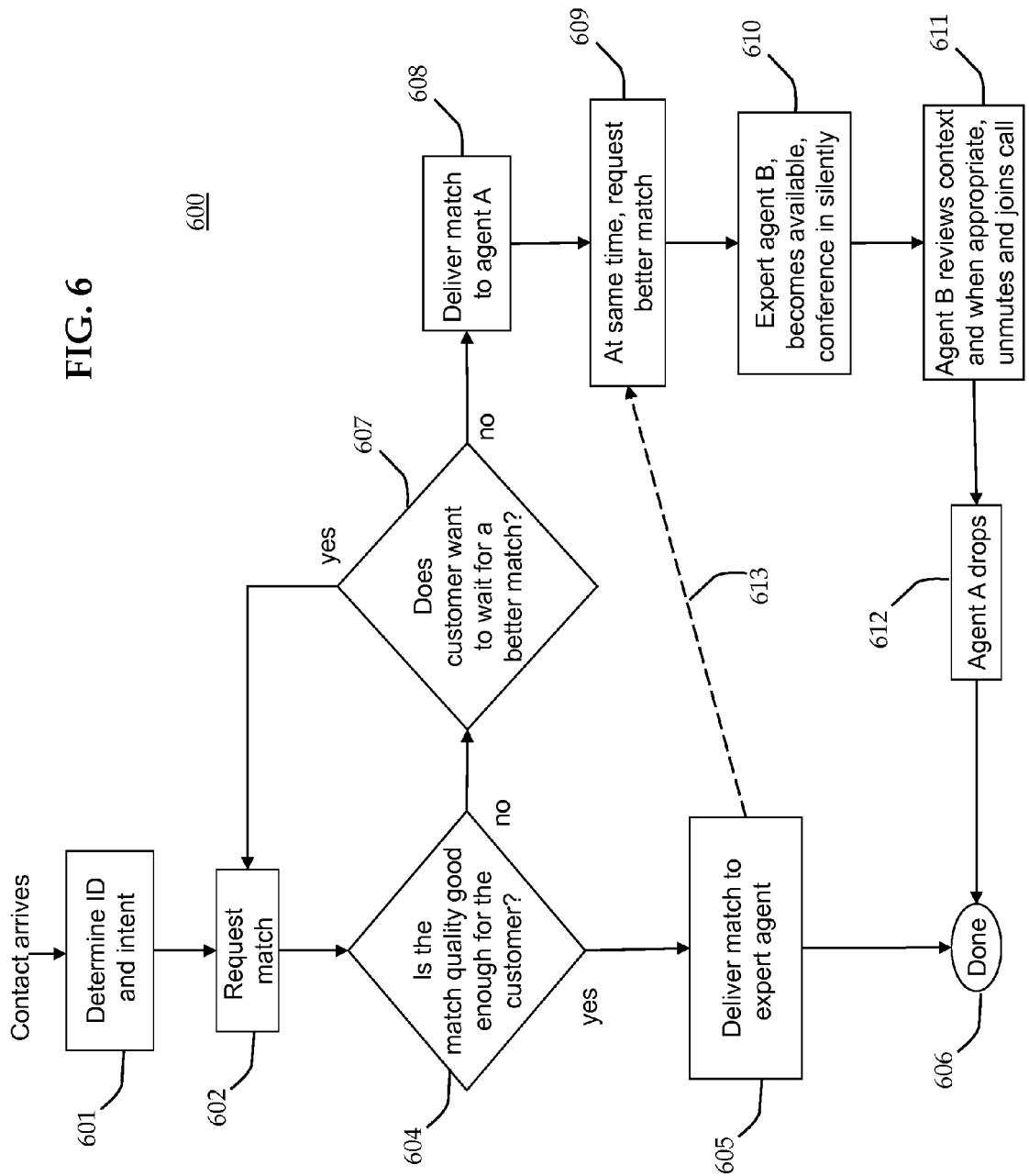
FIG. 6 is a flow chart depicting a flow for waiting, or servicing a customer with a first agent while searching for a second agent, in accordance with an embodiment of the present invention.

In accordance with another embodiment of the present invention, utilizing the systems described in FIGS. 1-3, there is provided another method, as depicted in the flow diagram 600 of FIG. 6, for attempting to deliver contacts to preferred agents in a contact center. In this embodiment, upon an initial match of the contact's attributes, ID and/or intent to the skills and attributes of an available agent, the contact is afforded a choice whether the identified agent is of sufficient quality in order to be used by the contact, or whether the contact will wait at least in the short term for a second agent that has skills and attributes that are a better match to the contact's attributes, ID and/or intent.

The method begins at step 601 where attributes, identification and/or intent (e.g., reason for contacting) are determined for a contact that has arrived. At step 602, the contact center requests a match between the contact's attributes, ID and/or intent, with agent skills and attributes, and a matching agent is identified. At decision step 604, the system facilitates letting the contact determine whether the skills and attributes of the agent identified from step 602 sufficiently match the contact's attributes, ID and/or intent. If the decision from step 604 is affirmative, then control of flow chart 600 passes to step 605, at which the customer is matched to the agent so identified, and control of flow chart 600 progresses to step 606 where the process ends.

On the other hand, if the decision from step 604 is negative, then control of flow chart 600 transitions to decision step 607, at which it is determined whether the customer wants to wait for a better agent match. If the first agent is a close enough match to the skills and attributes that the customer wants, the customer may decide to speak to the first agent, otherwise the customer may decide to wait for a better match. In an example in accordance with embodiments of the invention, the calling center system may inform the customer that "I have a great agent but they only speak a little Spanish would you like to wait for someone more proficient in Spanish?" Or, the calling center may inform the customer that "I have a customer service agent available, would you like to wait for a sales representative?" The customer may decide that they are willing to try this match.

The customer may be informed of the expected waiting time so that the customer can better decide whether to wait. Optionally, the customer may be offered this choice only if the expected waiting time for a preferred agent to become available is less than the customer's wait tolerance. This option would reduce the likelihood that the customer would abandon the call. The wait tolerance of the contact may be found in the internal database 328 of the reporting engine 324. This is achieved by looking at average abandon time, or alternatively, using the abandon time for the queue (maybe at the 90th percentile or so). Optional embodiments of the present invention with respect to the waiting in connection with step 607 are described below in connection with FIG. 7.

If the decision from step 607 is affirmative, then control of flow chart 600 loops back to step 602, at which the calling center will once again request a match between the contact's attributes, ID and/or intent, with agent skills and attributes, and a different matching agent will be identified in step 602. The process thereafter continues as described above in reference to step 602.

However, if the decision from step 607 is negative, then control of flow chart 600 transitions to step 608, at which the customer information is delivered to the first agent, even though the skills and attributes of the first agent do not match with sufficient quality the attributes, ID and/or intent of the contact, as determined from step 604. After step 608, flow diagram 600 continues with step 609, during which the system will continue to find an available agent. At step 610, a preferred, second agent who has become available is identified, and the second agent may be conferenced (i.e., joined) to the call initially in a silent, monitoring-only mode. The second agent may spend this time reviewing the history of the interaction so far with the first agent, such as by reviewing notes, audio recordings, prior history, etc.

Optionally at step 610, the second agent may be conferenced to the call only if the level of match of the second agent exceeds the level of match of the first agent by at least a predetermined threshold. Optionally after step 610, the system may continue to search for an available agent having a better level of match than that of the first agent or the second agent.

At step 611, at an appropriate time in the conversation of the first agent with the customer, the presence of the second agent is disclosed to the customer, by either the first or second agent, and the second agent begins to engage the customer. At step 612, at an appropriate time in the conversation of the first and/or second agent with the customer, the first agent will drop off the call. Control of flow chart 600 then transitions to step 606, at which the process ends.

Optionally, during step 605, it may become clear to the first agent and/or the customer that a different set of agent skills, attributes and/or permission levels than what was initially expected may be needed to handle the customer's problem. Therefore, during step 605 the agent may initiate an optional transfer 613 to step 609 in order to start the search process for an agent with a set of skills and attributes more suited to the customer's needs.

In accordance with one embodiment of the present invention, utilizing the systems described in FIGS. 1-3, FIG. 7 provides a method depicted in the flow diagram 700 for waiting for a preferred agents in a contact center. Flow diagram 700 may be useful as an embodiment of a wait loop implicitly indicated by the combination of steps 601, 602, 604 and 607 of FIG. 6.

Figure 7:
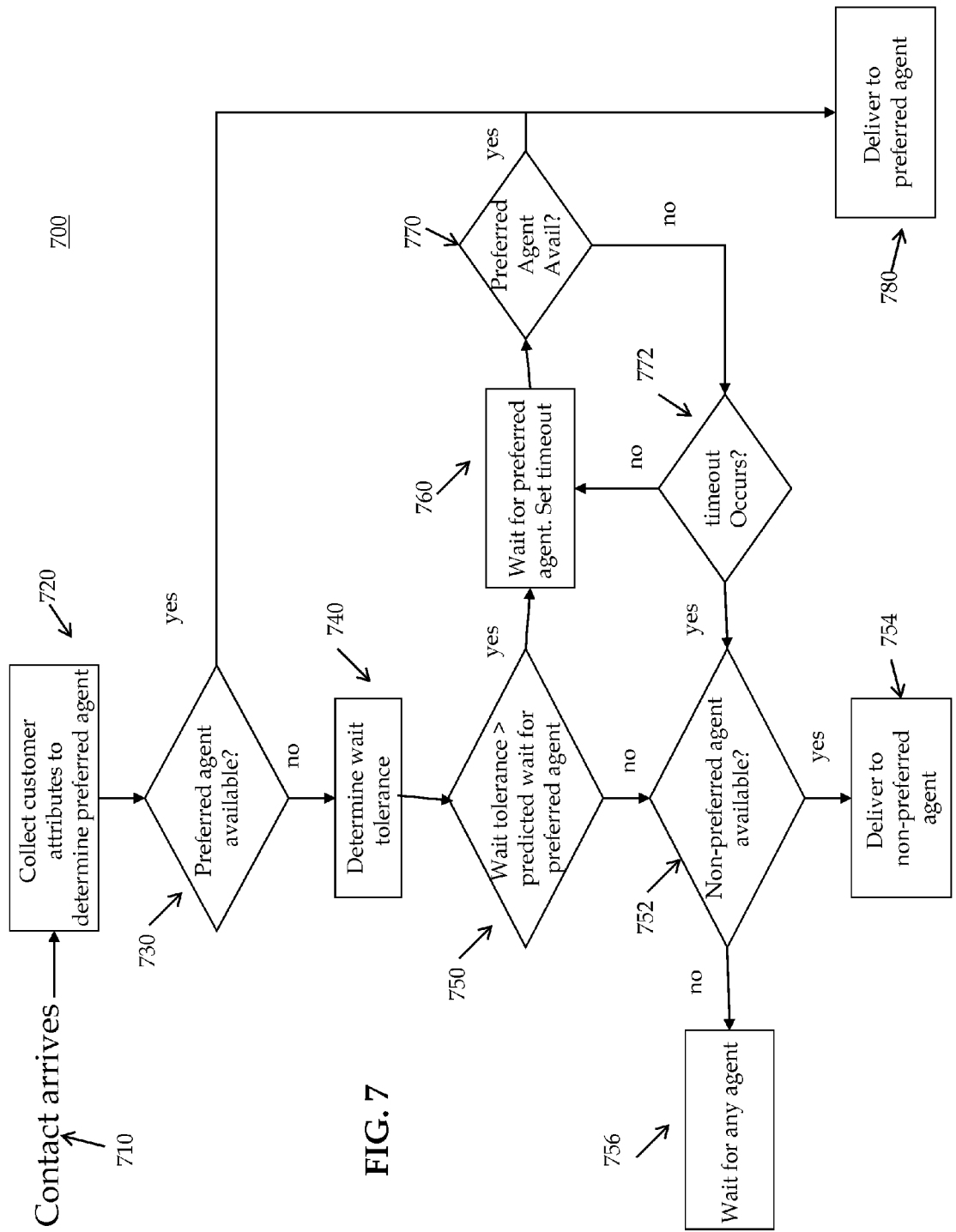
FIG. 7 is a flow chart depicting a flow for waiting, in accordance with an embodiment of the present invention.

The method of FIG. 7 begins at step 710 where a contact arrives at the contact center 100. At step 720, the agent and contact selector 220 is collecting the customer attributes so the system 220 can begin to determine a preferred agent for the contact that has arrived at the contact center 100. At step 730, after the preferred agent has been identified, the method queries whether that preferred agent is available. If the agent is not available, then at step 740, the method determines the wait tolerance of the contact. The wait tolerance of the contact may be found in the internal database 328 of the reporting engine 324. This is achieved by looking at average abandon time, or alternatively, using the abandon time for the queue (maybe at the 90th percentile or so). As another alternative, the system can determine wait tolerance by using the service objective for the queue.

At step 750, the method determines if the wait tolerance of the contact is greater than the predicted wait for the preferred agent. The predicted wait period for the preferred agent may be determined by a known "expected wait time" module. If the expected wait time is greater, then at step 760, the contact is put into a queue to wait for the preferred agent. At substantially the same time, the system sets a timeout value equal to the wait tolerance time or predicted wait time, whichever is less. At step 770, if the preferred agent becomes available before the timeout occurs, then at step 780, the contact is delivered to the preferred agent and the steps of this embodiment of the method ends.

Alternatively, if at step 750 the wait tolerance is not greater than the predicted wait period for the preferred agent, at step 752, the method determines if a non-preferred agent is available. If so, at step 754, the contact is delivered to the non-preferred agent. If, on the other hand, a non-preferred agent is not available at step 752, then the contact is queued to wait for any agent at step 756.

In another embodiment of the present invention, if the set timeout occurs at step 772, then the method determines if a non-preferred agent is available at step 752. The steps then repeat as before. Alternatively, of course, if at step 730 the preferred agent is available at the time of inquiry, then the contact is delivered directly to the preferred agent at step 780 and the method promptly ends.

As another alternative, if at step 750 the wait tolerance is less than the predicted wait period for a preferred agent or at step 772 where a timeout occurs, rather than delivering a non-preferred agent, the method may interrupt a preferred agent from performing auxiliary work or the method may assign the contact to a preferred agent who is capable of handling multi-tasks, i.e., an agent already assigned to at least one other contact but one who, without much degradation of service, can handle another contact.

In yet another alternative step of an embodiment of the present invention, there is provided an option to speak to the contact and state, for example, "The expected wait time for our best agent (or for your preferred language) to the contact is . . . " and let the contact decide if he or she wants to wait for a preferred agent.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to service a contact by a first agent while searching for a second agent to service the contact, comprising:

describing substantially each undifferentiated agent by use of at least one agent attribute to produce a set of agent attribute values;

describing the contact by use of at least one contact attribute to produce a set of contact attribute values;

relating the set of agent attribute values to the set of contact attribute values in order to search for at least one available first agent having at least a first predetermined level of match between the set of agent attribute values and the set of contact attribute values;

delivering the contact to the first agent;

recognizing, by the processor, that the first agent does not have at least a second predetermined level of match between the set of agent attribute values and the set of contact attribute values, in order to produce a recognition;

initiating, by a processor and based only upon the recognition, a process to relate the set of agent attribute values to the set of contact attribute values in order to search for the existence of at least one second agent having at least the second predetermined level of match between the set of agent attribute values and the set of contact attribute values, wherein the second predetermined level of match is greater than the first predetermined level of match;

recognizing, by a processor, that the second agent exists;

waiting until the second agent is available; and initiating, by a processor, a process to replace the first agent with the second agent to service the contact.

2. The method of claim 1, further comprising: searching for at least one second agent only if the first predetermined level of match is less than a predetermined threshold.

3. The method of claim 1, further comprising: querying whether the level of match of the first agent is acceptable.

4. The method of claim 1, further comprising: receiving an indication whether the level of match of the first agent is acceptable, wherein a search for at least one second agent is performed only if the level of match of the first agent is not acceptable.

5. The method of claim 1, further comprising: querying whether the contact will communicate with the first agent while the system searches for a second agent.

6. The method of claim 1, further comprising: querying whether the contact will wait for an agent having a level of match higher than the level of match of the first agent.

7. The method of claim 1, wherein the step of replacing the first agent with the second agent is performed only if the level of match of the second agent exceeds the level of match of the first agent by a predetermined threshold.

8. The method of claim 1, wherein priority during replacing the first agent with the second agent is given to a contact that is being served by a non-preferred agent.

9. The method of claim 1, wherein replacing the first agent with the second agent comprises selectably adding the second agent in one of a listen-only mode and a talk mode.

10. The method of claim 1, further comprising alerting the second agent if predetermined service-related criteria are met.

11. A system to service a contact by a first agent while searching for a second agent to service the contact, comprising:

a processor;

a memory coupled to the processor, the memory configured to store software that, when executed by the processor, performs the steps of:

describing substantially each undifferentiated agent by use of at least one agent attribute to produce a set of agent attribute values;

describing the contact by use of at least one contact attribute to produce a set of contact attribute values;

relating the set of agent attribute values to the set of contact attribute values in order to search for at least one available first agent having at least a first predetermined level of match between the set of agent attribute values and the set of contact attribute values;

delivering the contact to the first agent;

recognizing, by the processor, that the first agent does not have at least a second predetermined level of match between the set of agent attribute values and the set of contact attribute values, in order to produce a recognition;

initiating a process, based only upon the recognition, to relate the set of agent attribute values to the set of contact attribute values in order to search for the existence of at least one second agent having at least the second predetermined level of match between the set of agent attribute values and the set of contact attribute values, wherein the second predetermined level of match is greater than the first predetermined level of match;

recognizing, by a processor, that the second agent exists;

waiting until the second agent is available; and initiating a process to replace the first agent with the second agent to service the contact.

12. The system of claim 11, wherein the memory is further configured to store software that, when executed by the processor, performs the step of: searching for at least one second agent only if the first predetermined level of match is less than a predetermined threshold.

13. The system of claim 11, wherein the memory is further configured to store software that, when executed by the processor, performs the step of: querying whether the level of match of the first agent is acceptable.

14. The system of claim 11, wherein the memory is further configured to store software that, when executed by the processor, performs the step of: receiving an indication whether the level of match of the first agent is acceptable, wherein a search for at least one second agent is performed only if the level of match of the first agent is not acceptable.

15. The system of claim 11, wherein the memory is further configured to store software that, when executed by the processor, performs the step of: querying whether the contact will communicate with the first agent while the system searches for a second agent.

16. The system of claim 11, wherein the memory is further configured to store software that, when executed by the processor, performs the step of: querying whether the contact will wait for an agent having a level of match higher than the level of match of the first agent.

17. The system of claim 11, wherein the step of replacing the first agent with the second agent is performed only if the level of match of the second agent exceeds the level of match of the first agent by a predetermined threshold.

18. A system to service a contact by a first agent while searching for a second agent to service the contact, comprising:
- an agent description module configured to describe substantially each undifferentiated agent by use of at least one agent attribute to produce a set of agent attribute values;
- a contact description module configured to describe the contact by use of at least one contact attribute to produce a set of contact attribute values;
- a first correlation module configured to relate the set of agent attribute values to the set of contact attribute values in order to search for at least one available first agent having at least a first predetermined level of match between the set of agent attribute values and the set of contact attribute values;
- a delivery module configured to deliver the contact to the first agent;
- a recognition module configured to recognize that the first agent does not have at least a second predetermined level of match between the set of agent attribute values and the set of contact attribute values, to produce a recognition;
- a second correlation module configured to initiate a process, based only upon the recognition, to relate the set of agent attribute values to the set of contact attribute values in order to search for the existence of at least one second agent having at least the second predetermined level of match between the set of agent attribute values and the set of contact attribute values, wherein the second predetermined level of match is greater than the first predetermined level of match;
- a recognition module configured to recognize that the second agent exists;
- a wait module configured to wait until the second agent is available;
- a replacement module configured to initiate a process to replace the first agent with the second agent to service the contact;
- a non-transitory computer readable medium configured to store modules, wherein the modules comprise one or more of the agent description module, the contact description module, the first correlation module, the delivery module, the second correlation module, the wait module and the replacement module; and
- one or more processors coupled to the non-transitory computer readable medium, wherein the one or more processors are configured to execute modules.

19. The system of claim 18, wherein the second correlation module is configured to search for at least one second agent only if the first predetermined level of match is less than a predetermined threshold.

20. The system of claim 18, further comprising a query module configured to query whether the level of match of the first agent is acceptable.

21. The system of claim 18, further comprising a receiver configured to receive an indication whether the level of match of the first agent is acceptable, wherein a search for at least one second agent is performed only if the level of match of the first agent is not acceptable.

* * * * *